July 15, 1952  C. WERTHER  2,603,320
CONTROL FOR MOTOR CARS AND THE LIKE
Filed March 2, 1951  2 SHEETS—SHEET 2
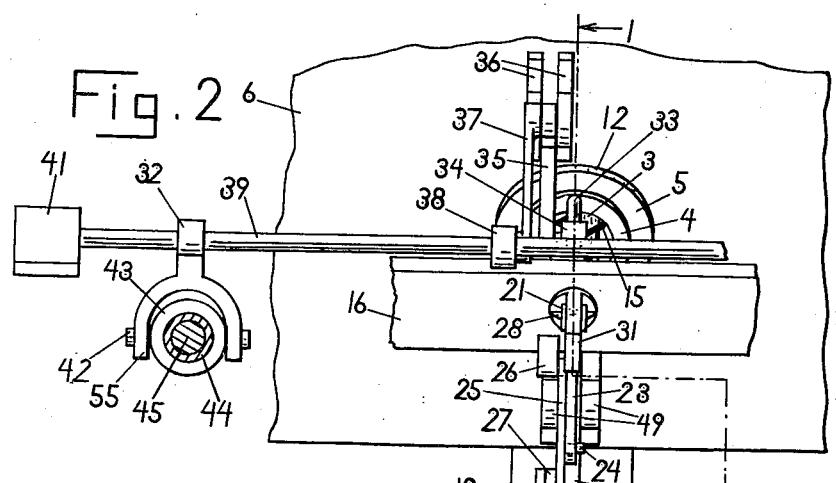
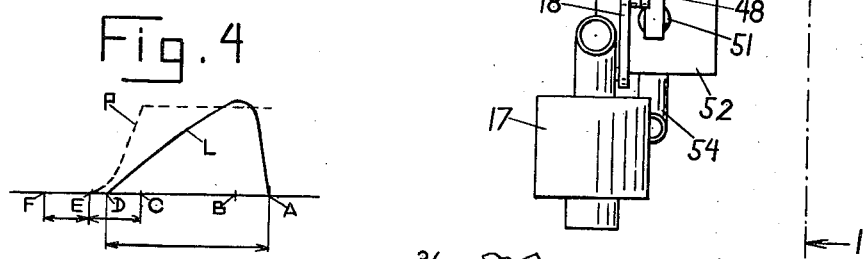
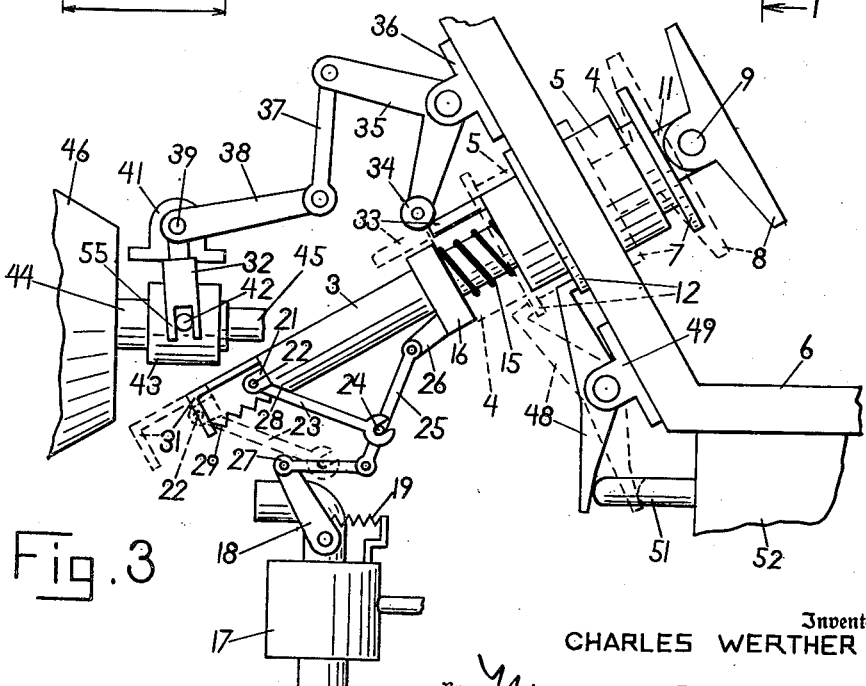
Inventor:
CHARLES WERTHER
By Maurice Bloch
Attorney Patented July 15, 1952

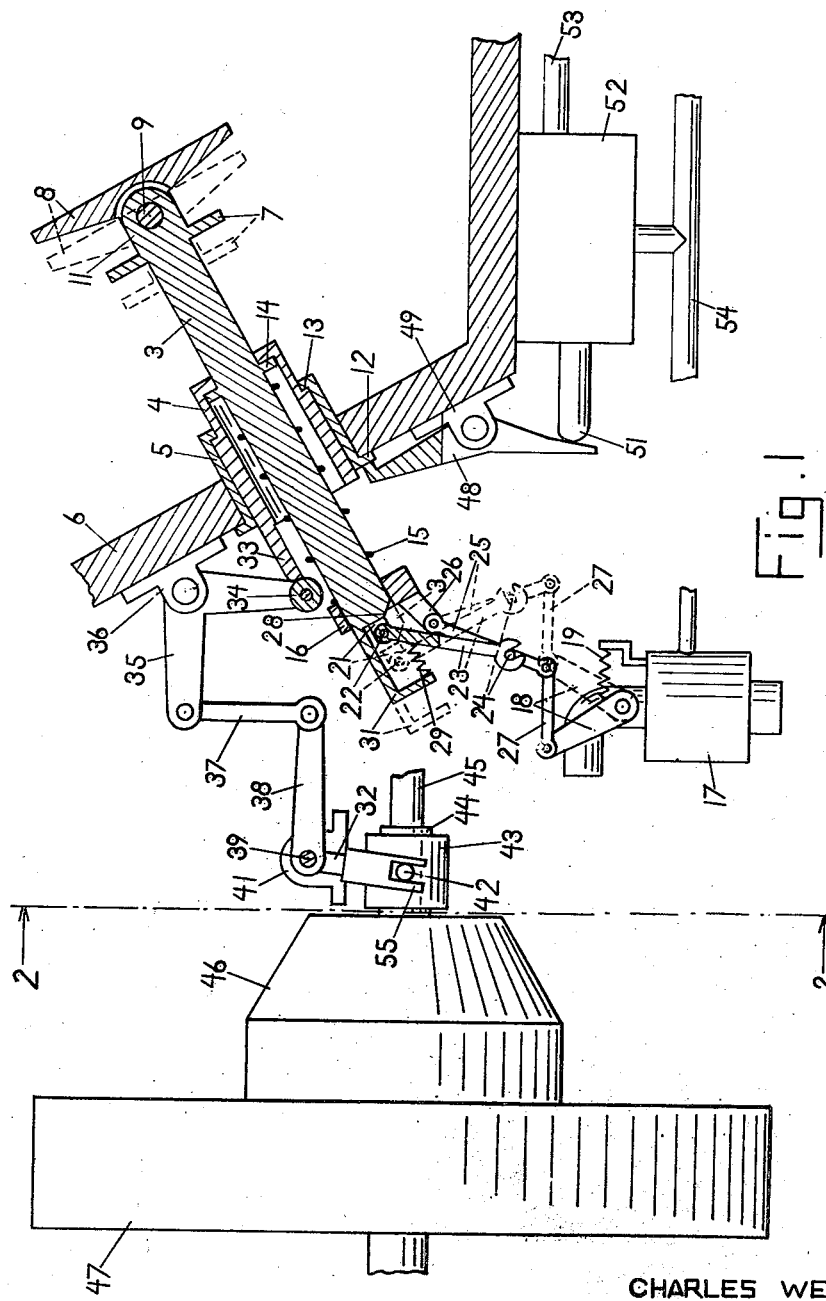

2,603,320

UNITED STATES PATENT OFFICE 2,603,320

CONTROL FOR MOTOR CARS AND THE LIKE

Charles Werther, Glen Cove, N. Y.

Application March 2, 1951, Serial No. 213,508

6 Claims. (Cl. 192—.094)

My invention relates to motor-driven machines and, more particularly, to automobiles, and an object of my invention is to simplify and to quicken the control of these machines and thereby to increase the safety of their operation.

More specific objects are to control gas or power supply, clutch and brakes with one pedal or master control member and by to and fro movement of this member in one direction, thereby to avoid the necessity to move the foot from one pedal to another or in any of several directions, thereby to avoid the possibility of mistakes in the selection of the pedal or of the moving direction and to save time. The reduction of the time interval between realization of the necessary control and the correspondingly effected control is sometimes of vital importance, for example, when sudden braking of an automobile is required.

Other objects are to derive the operation of the clutch and of the brakes from the member which controls the gas or power supply, to arrange a member for the control of the brakes in such a manner that this member activates the brakes only after the gas supply has been reduced to minimum and after the clutch has been disengaged, to effect gas reduction, clutch disengagement and braking with one step or tread, and thereby to increase the safety of operation still further.

Further objects are to reduce the gas supply by a down or forward directed pedal movement whereby continuation of this movement has the correct direction for disengaging the clutch and for braking, to provide means urging the pedal in the opposite direction whereby relaxation of the foot pressure will cause the brakes to disengage, the clutch to engage and the gas supply to increase, thereby to effect a high gas supply with an almost completely relaxed foot and thereby to avoid excessive strain of the foot when, for example, in long distance driving, the maintenance of a high gas supply is necessary for a long time.

Still other objects are to simplify the structure of the control, to avoid a multiplicity of pedals crowding the space before the driver, thereby to make the driver more comfortable and to facilitate the leaving and the occupation of the driver's seat.

Still further objects are to attain these results with reliable, simple and inexpensive means, with means that can be easily and accurately adjusted and can be conveniently incorporated in an automobile, and with means that can cooperate with any type of power or gas regulators, with any type of clutch and with any type of brake.

Still other objects and advantages will appear from the following description of an exemplifying embodiment of my invention, from the appended claims and from the accompanying drawing in which:

Fig. 1 shows a vertical cross-section of an illustrative embodiment of my invention, this cross-section being taken along the broken line 1—1 in Fig. 2.

Fig. 2 shows a front view of the same embodiment seen from a cross-section taken along the line 2—2 in Fig. 1.

Fig. 3 shows a side view of the same embodiment seen in the same direction as Fig. 1, parts of this embodiment being represented in positions different from their positions in Fig. 1.

Fig. 4 is a diagram illustrating functions of the embodiment shown in Figs. 1 to 3.

The shown embodiment comprises a power or gas control member 3, a clutch control member 4 and a brake control member 5. The gas control member 3 performs the function of a master control member from which the operation of the members 4 and 5 is derived as will be described later. The member 3 is preferably movable in a downwardly inclined rear-front direction. The three members 3, 4 and 5 are guided relatively to each other in such a manner that they are movable in definite paths. For example, these members may be arranged like the parts of a telescope, the member 3 forming a cylindrical shaft passing slidably through a bore of the tubular member 4 which, in turn, is slidable in the tubular member 5. The member 5 is guided in a stationary element, for example, in the floor wall 6 of the driver's seat.

In this specification and in the appended claims, I use the word "stationary" to indicate elements which do not move relatively to the frame and body of the automobile. Of course, these stationary elements move with the body when the automobile is driven.

The member 3 is provided with a collar or annular projection 7 positioned near the rear end of this member. This rear end is connected to a pedal 8. For example, this pedal may be rotatably connected by a horizontal axle 9 to a lug 11 forming a rear extension of the member 3. This rotatable connection allows adaptation of the pedal's inclination to the sole of the driver and thereby facilitates a convenient and forceful operation along the elongated path of the pedal.

Stops are provided which define rear end positions of the members 3, 4 and 5. For example, the member 5 has a flange 12 contacting the wall 6 in the extreme rear position of this member. The member 4 has a shoulder 13 stopped by the member 5 in the rear end position of these members. The member 3 has a flange 14 which contacts the member 4 when in the extreme rear position.

Means are provided for urging these three members toward their rear end positions. These means are preferably resilient and may be constituted by a spiral spring 15 having one end pressing against the flange 14 and having another end pressing against a stationary strip or wall 16.

The power or gas supply to the motor can be adjusted between a minimum and a maximum by a regulator which is incorporated in a carburetor 17 in well known manner and is operated by a lever 18. This lever can turn between the minimum position shown in Fig. 1 in full lines and the maximum position shown in Fig. 1 in dotted lines. The lever is always urged toward its minimum position, for example, by a spring 19.

Means are provided which connect the gas control member 3 operatively with the gas regulating lever 18. These means are so designed that the following operative relationship is attained: The lever 18 is in minimum position when the member 3 is in the advanced position shown in Fig. 3 in full lines and preferably also when the member 3 in the rear end position shown in Fig. 1 in full lines. Between these two minimum positions, the path of the member 3 has a position which corresponds to the maximum position of the lever 18. The latter position is indicated in Fig. 1 by dotted lines. When the member 3 moves between its maximum position and its advanced minimum position, the corresponding regulating movement of the lever 18 is relatively slow, facilitating gradual regulation. When the member 3 moves between its maximum position and its rear end position, the lever 18 changes suddenly or quickly between maximum and minimum position.

This operative relationship between the member 3 and the lever 18 can obviously be established by different known means. The shown embodiment avoids the use of curved guides and complicated mechanisms and uses only a few rods and hinge connections.

The front end of the member 3 passes slidably through the strip 16 and has two little projections 21 through which the hinge pin 22 passes. A rod 23 has one end hinged to this pin and another end shaped like a fork and hingedly engaging a pin 24. The latter pin is affixed to a median point of a rod 25. The rod 25 has one end hinged to a stationary bearing 26 which, for example, is affixed to the strip 16. The other end of the rod 25 is connected to the lever 18, for example, by a rod 27 having ends hinged to the rod 25 and to the lever 18.

In Fig. 4 the curve L illustrates the movement of the lever 18 resulting from the described leverage. The axis A—F indicates the path of the member 3. The point A corresponds to the rear end position of any point of the pedal or of this member, for example, of the hinge point 22. The abscissas of the points B, C, D, E and F correspond to the distances of other positions of the member 3 from the end position A. The ordinates of the curve L are proportional to the angle about which the lever 18 is turned out of its minimum position. When the member 3 is in position B as shown in Fig. 1 in dotted lines, the lever 18 is in maximum position. When the member 3 is in position A or D, the lever is in minimum position. The way from A to B is much shorter than that from B to D.

The position D is indicated in Fig. 3 in full lines. In this position, the rod 23 contacts a stop surface 28 of the member 3. A spring 29 affixed to a front projection 31 of the member 3 urges the rod 23 toward the surface 28. When the member 3 moves forward beyond the position D, for example, as far as the front end position F indicated in Fig. 3 in dotted lines, the forked end of the rod 23 releases the pin 24, the lever 18 remains in its minimum position, and the rod 23 moves parallel to itself. When the member 3 returns to D, the rod 23 engages the pin 24 again.

The clutch control member 4 is operatively connected to a clutch lever 32, for example, in the following manner: A front projection 33 of the member 4 contacts roller 34 which is rotatably carried by one arm of an angular lever 35. This lever is rotatable in a pair of stationary bearings and has another arm to which one end of a rod 36 and has another arm to which one end of a rod 36 is hinged. The other end of this rod is hinged 37 is hinged. The other end of this rod is hinged to an arm 38 which is affixed to a shaft 39. The shaft 39 is rotatably supported in stationary bearings 41 of which only one is shown. The clutch lever 32 forms another arm affixed to the same shaft.

The clutch lever operates a clutch in well known manner. For example, the clutch lever has an end forming two forks 55 engaging a pair of pins 42 which are affixed to a throw-out muff 43. A sleeve 44 is engaged by the muff 43 in axial direction and can rotate in the muff together with the clutch shaft 45. Movement of the sleeve 44 to the right side in Fig. 1 reduces the coupling pressure of the springs which may be arranged in any known manner in the housing 46 which is affixed to the motor flywheel 47 and surrounds the coupling members of the clutch.

In Fig. 4, the dotted line P indicates the pressure which exists between the coupling surfaces of the clutch. When the member 3 is in any position from A to C, the clutch lever 32 is in the position shown in Fig. 1 and the pressure indicated by the line P is a maximum. When the member 3 moves from position A beyond position C, the collar 7 engages the member 4. The movement of the latter member operates the lever 32 whereby the coupling pressure is gradually reduced until this pressure becomes zero and the clutch is completely uncoupled. At this time, the member 3 has reached the position E. Fig. 3 shows a position D which is reached when the coupling pressure is almost reduced to zero. In this position, the roller 34 is contacting a rounded edge of the projection 33. In position E, the roller has moved completely out of the way of the projection 33. While the member 3 moves from E to F, the projection 33 does not engage the roller operatively, but by-passes the same. During this time, the clutch remains uncoupled.

When the member 3 moves from position E to position F, the collar 7 engages the brake control member 5 from which application of the brakes may be derived, for example, in the following manner: The flange 12 of the member 5 presses against an arm of a lever 48 which is rotatably supported by a pair of stationary bearings 49. The other arm of the lever 48 presses against a stem 51 which, when pressed into the housing 52 of the master valve of a liquid-operated brake system, connects in well known manner the pressure pipe 53 with the pipe system 54 and thereby in known manner, with the individual brake cylinders. When the pressure on the stem 51 ceases, the valve and the stem are returned in known manner to the original position, in which the brakes are released. Figs. 1 and 3 show the brake-releasing position of the lever 48 and of the stem 51 in full lines while the braking position is indicated in Fig. 3 by dotted lines.

The described embodiment may be operated in the following manner:

When the automobile is not used, the device is in the position shown in full lines in Fig. 1 corresponding to A in Fig. 4. As usual, the hand brake is tightened and the fuel supply is shut off. In order to start, the pedal 8 is pressed down, preferably completely as far as position F or at least as far as point E. Then the fuel supply is opened and the motor is started, for example, by pressing the starter button. When the motor runs and after the hand brake has been released, the pressure on the pedal is gradually relaxed, moving the control device to position C where the clutch is again in full engagement. The engagement of the clutch causes the automobile to move in known manner.

During the drive, the power supply to the motor is regulated by adjustment of the gas control member between the positions B and D. If the gear shift system of the automobile requires uncoupling, the member 3 is pressed down toward position E until the clutch is sufficiently uncoupled before the gear is shifted whereupon the member is returned again into a position between B and D.

When the automobile shall be stopped, the pedal is completely pressed down either gradually or, in cases of emergency, quickly. Then the hand brake is applied and the fuel supply is shut off as usual. When the foot of the driver is then withdrawn, the device quickly returns into the position A.

If it is desired that the motor runs idly with minimum gas supply, the driver has the choice between positions A and E. He may use the position A, for example, when driving down a hill with coupled motor. The position E in which the clutch is uncoupled, may be used when the automobile shall not move.

If the foot of the driver happens to slip from the pedal, for example, because of sudden illness, the device moves automatically and instantly into position A in which the minimum gas supply will be insufficient to drive the automobile with coupled motor.

I desire it understood that my invention is not confined to the particular embodiment shown and described, the same being merely illustrative, and that my invention may be carried out in other ways within the scope of the appended claims without departing from the spirit of my invention, as it is obvious that the particular embodiment shown and described is only one of the many that may be employed to attain the objects of my invention.

Having described the nature of my invention, what I claim and desire to protect by Letters Patent is:

1. A control device for a motor-driven machine, said device comprising a power control member, a clutch control member, a brake control member, each of said three members being movable in a guided path, stops defining end positions of said members, means urging said members toward said end positions, and means engaged by said power control member and operatively engaging said clutch control member and said brake control member when said power control member moves along portions of its path which path portions are spaced from said end position of said power control member, the path portion where said latter means engage said brake control member being more spaced from said latter position than the portion where said latter means engage said clutch control member said latter means in each engaged position forming a substantially rigid connection between said power control member and the engaged clutch and brake control members, respectively, and enforcing one definite position of the respective engaged member for each engaging position of said power control member.

2. A control device for a motor-driven machine having a power regulator gradually adjustable between a minimum and a maximum position, said device comprising a power control member, a brake control member, said members being movable in guided paths, stops defining end positions of said members, means urging said members toward said end positions, means connecting said power control member operatively with said regulator, a position of said power control member which corresponds to said minimum position of said regulator being more spaced from said end position of said power control member than a position of the latter which corresponds to said maximum position, and means engaged by said power control member and operatively engaging said brake control member when said power control member moves farther away from its end position than that position which corresponds to said minimum position of said regulator said latter means in each engaged position forming a substantially rigid connection between said power control member and the engaged clutch and brake control members, respectively, and enforcing one definite position of the respective engaged member for each engaging position of said power control member.

3. A control device for a motor-driven machine having a power regulator gradually adjustable between a minimum and a maximum position, said device comprising a power control member, a brake control member, said members being movable in guided paths, stops defining end positions of said members, means urging said members toward said end positions, means connecting said power control member operatively with said regulator, a position of said power control member which corresponds to said minimum position of said regulator being more spaced from said end position of said power control member than a position of the latter which corresponds to said maximum position, said latter means including disengageable elements disconnecting said power control member and said regulator when said power control member moves farther away from its end position than that position which corresponds to said minimum position of said regulator, and means engaged by said power control member and operatively engaging said brake control member when said power control member moves farther away from its end position than that position which corresponds to said minimum position of said regulator said latter means in each engaged position forming a substantially rigid connection between said power control member and the engaged clutch and brake control members, respectively, and enforcing one definite position of the respective engaged member for each engaging position of said power control member.

4. A control device for a motor-driven machine having a power regulator gradually adjustable between a minimum and a maximum position, said device comprising a power control member, a brake control member, said members being movable in guided paths, stops defining end positions of said members, means urging said members toward said end positions, means connecting said power control member operatively with said regulator, said end position of said power control member corresponding to said minimum position of said regulator, another position of said power control member which corresponds to said minimum position of said regulator being more spaced from said end position of said power control member than a position of the latter which corresponds to said maximum position, and means engaged by said power control member and operatively engaging said brake control member when said power control member moves farther away from its end position than that other position which corresponds to said minimum position of said regulator said latter means in each engaged position forming a substantially rigid connection between said power control member and the engaged clutch and brake control members, respectively, and enforcing one definite position of the respective engaged member for each engaging position of said power control member.

5. A control device for a motor-driven machine having an automatically coupling and uncoupable clutch, said device comprising a power control member, a clutch control member, a brake control member, said members being movable in guided paths, stops defining end positions of said members, means urging said members toward said end positions, means engaged by said power control member and operatively engaging said clutch control member and said brake control member when said power control member moves along a portion of its path which portion is spaced from said end position of said power control member said latter means in each engaged position forming a substantially rigid connection between said power control member and the engaged clutch and brake control members, respectively, and enforcing one definite position of the respective engaged member for each engaging position of said power control member, and means operatively connecting said clutch control member with said clutch and including disengageable elements which by-pass each other when said clutch is in uncoupled position.

6. A control device for an automobile, said device comprising a tubular brake control member guided in a stationary part of said automobile, a tubular clutch control member guided in said brake control member, a gas control member guided in said clutch control member and automatically urged toward an end position, and a projection affixed to said gas control member and engaging said clutch control member and said brake control member when said gas control member is moved out of said end position, said projection being more spaced from said brake control member than from said clutch control member when said gas control member is in said end position.

CHARLES WERTHER.

REFERENCES CITED

The following references are of record in the file of this patent:

UNITED STATES PATENTS

| Number | Name | Date |
|---|---|---|
| 1,985,168 | Heinze | Dec. 18, 1934 |
| 2,063,793 | Cook | Dec. 8, 1936 |
| 2,136,760 | Saines | Nov. 15, 1938 |
| 2,157,588 | Brewer | May 9, 1939 |
| 2,162,183 | Smith | June 13, 1939 |

FOREIGN PATENTS

| Number | Country | Date |
|---|---|---|
| 293,693 | Great Britain | Oct. 9, 1929 |
| 485,901 | Great Britain | May 26, 1937 |